July 2, 1957  J. Z. JUREK  2,797,762
ANTI-SKID APPARATUS FOR AUTOMOTIVE VEHICLES
Filed May 18, 1954  2 Sheets-Sheet 1

INVENTOR.
John Z. Jurek.
BY
Mason, Mason & Sheridan
Attorneys.

July 2, 1957  J. Z. JUREK  2,797,762
ANTI-SKID APPARATUS FOR AUTOMOTIVE VEHICLES
Filed May 18, 1954  2 Sheets-Sheet 2
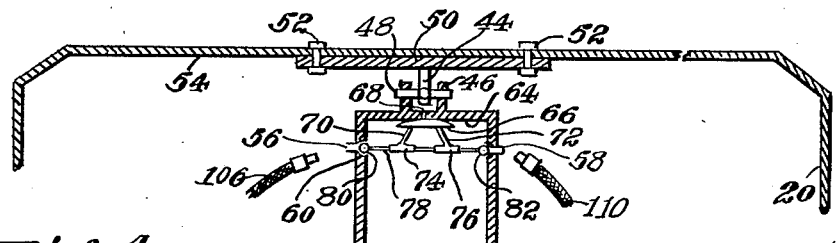
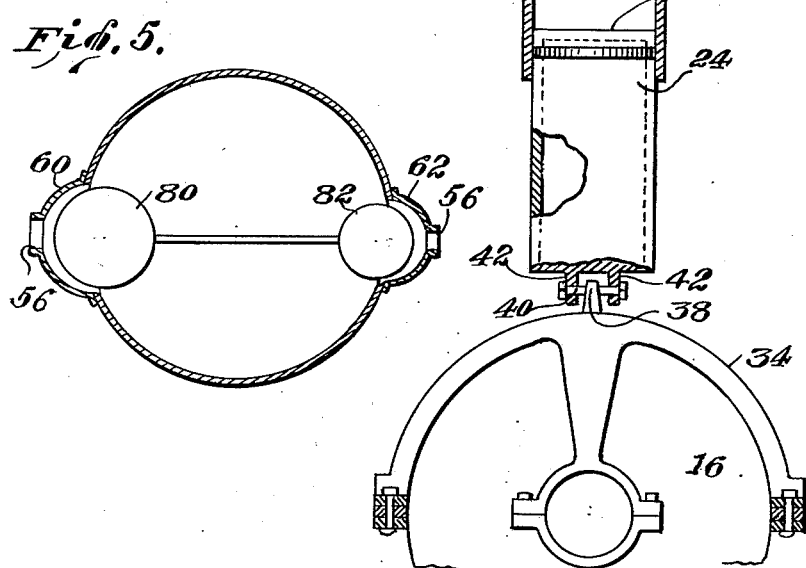
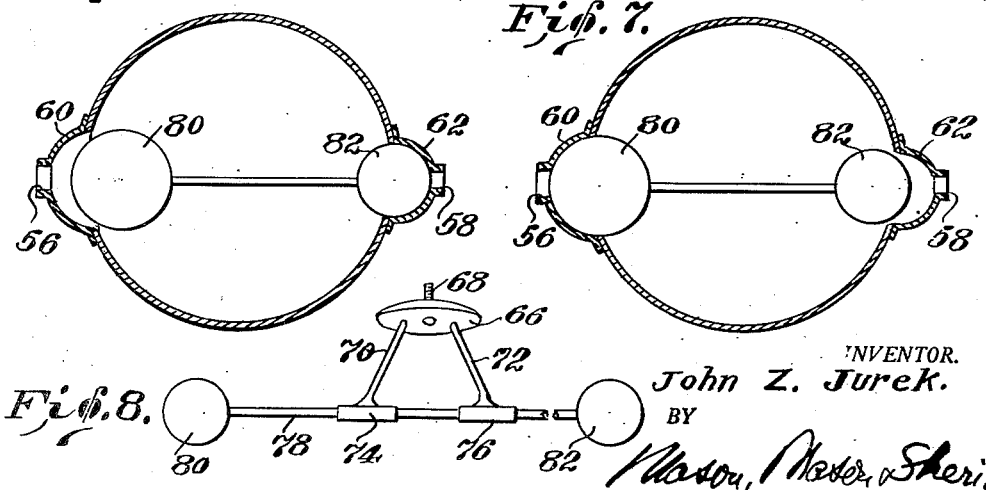
INVENTOR.
John Z. Jurek.
BY
Mason, Mason & Sheridan
Attorneys.

United States Patent Office 2,797,762
Patented July 2, 1957

2,797,762

ANTI-SKID APPARATUS FOR AUTOMOTIVE VEHICLES

John Z. Jurek, Utica, N. Y.

Application May 18, 1954, Serial No. 430,669

8 Claims. (Cl. 180—1)

This invention relates to an apparatus for increasing the traction properties of the wheels of an automotive vehicle such as an automobile, and to prevent skidding of the same.

The principal object of the invention, therefore, is to provide a device which may be attached to an automotive vehicle, or that may be made an integral part thereof at the factory, which will materially add traction qualities to the drive wheels thereof and which will prevent spinning.

An additional object includes the provision of mechanism for operating the traction increasing mechanism by the driver of such vehicle and thereby enable him to have complete control over the traction of the vehicle's tires at all times, and under all weather and road conditions.

A further object is the provision of a device of the kind described which consists of a minimum of parts and which may be readily attached to or detached from existing automotive vehicles, including pleasure cars, trucks, buses and other types of vehicles.

Other objects will appear hereinafter throughout the specification.

In the drawings:

Figure 4 is a vertical section of the vertical piston and cylinder assembly and the attaching parts thereof, some of which are shown in full lines for mounting the same on an automotive vehicle, and showing the fluid lines disconnected;

Figures 5, 6 and 7 show the dual valve mechanism in their several operating positions; and Figure 8 is an enlarged perspective view of the valves and the mounting therefore shown in Figure 4.

Many attempts have been made to increase the drive wheel gripping qualities of the rear drive wheels of an automotive vehicle. Such vehicles, particularly when parked, encounter difficulties in leaving the parking place during such times as when the road surfaces are covered with mud, ice or snow. In attempting to get the car out of the parking place the wheels frequently spin in one place. This spinning of the wheels is due to the fact that the driver has little or no control over the traction qualities of the driving wheels. With the device of the present invention it is possible for the driver, without moving from the driver's seat to vary the amount of traction of the drive wheels, and thus provide a ready manner of overcoming skidding or spinning of the car's tires.

Figure 1:
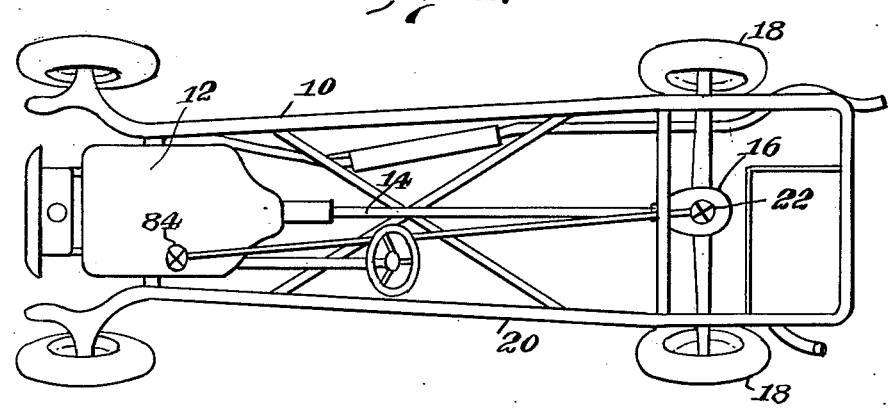
Figure 1 is a top plan view of an automotive vehicle with the body removed showing the placement of the parts of the device of this invention.
Figure 2:
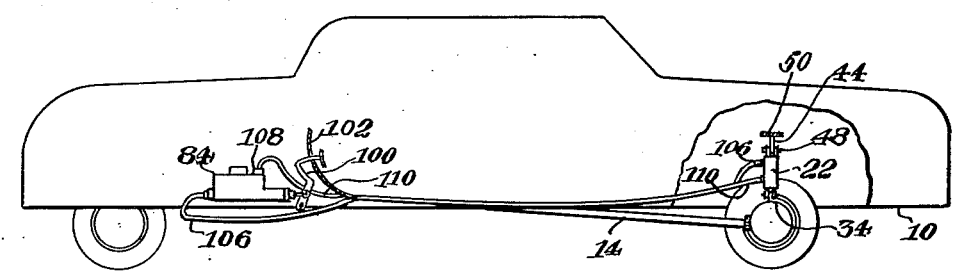
Figure 2 is a side elevational view of the structure of Figure 1, with the vehicle body shown in outline and partly broken away.
Figure 3:
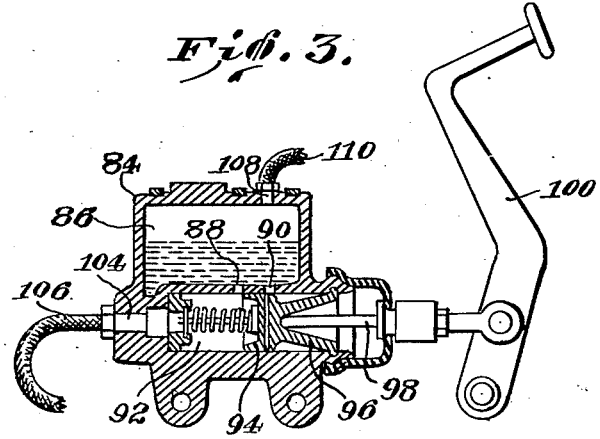
Figure 3 is a vertical section with the parts shown in full lines, of the power cylinder and piston assembly, and of the reservoir for the same.

Referring to Figures 1 and 2 of the drawings the vehicle as a whole is indicated by the numeral 10. The vehicle is provided with the usual source of power 12, propeller shaft 14, differential 16, rear drive wheels 18 and framework 20.

Referring to Figures 2 and 4 there is shown a cylinder 22 having a piston 24. The lower end of the piston is attached to a supporting spider 34 that partially surrounds the conventional differential 16 of the vehicle, by means of the universal connection 38. This universal connection includes a pin 40 sliding in ears 42 in order that there may be no interference or binding movements due to relative movements of the differential and the body, and to thereby permit free sliding movement of the piston 24 in the cylinder 22.

The upper end of the cylinder is provided with a similar universal connection 44 that includes the ears 46 and the sliding pin 48. This universal connection 44 is mounted on body attaching plate 50, which plate is rigidly connected by means of the bolts 52, to longitudinal portions of the frame 20, as connected by plate 54.

Cylinder 22 is provided adjacent the upper end thereof with a fluid inlet 56 and a fluid exit 58. These parts, as shown in Figures 5, 6, and 7, form a part of the semi-spherical seats 60 and 62 respectively.

The top 64 of the cylinder 22 supports a valve assembly attachment plate 66 which is connected to said top by the connecting screw or other attaching member 68. Extending downwardly from plate 66 are a pair of arms 70 and 72, the lower extremities of which form bearings 74 and 76, respectively. Sliding in these bearings is the rod 78, the opposite ends of which support ball valves 80 and 82.

As will be seen by reference to Figures 6, 7, and 8, the ball valves and seats are of different size, the larger ball and seat being adjacent to the inlet of the cylinder 22 and the smaller ball and seat being located adjacent to the exit. When the pressure in the master cylinder 92 is greater than the pressure in the pressure line, such pressure will cause valve 80 to open and valve 82 to close, as shown in Figure 6. This is the position that the parts will assume when the pedal 100 is operated. When the pressure is withdrawn from the pedal 100, the ball valves will assume the position shown in Figure 7, and any fluid in the cylinder 22 which has reached the level of the exit 58, will flow back through the exit 58 to the reservoir 86.

As seen in Figures 5, 6, and 7, ball valve 80 is larger than ball valve 82, and its seat 60 is correspondingly larger than the seat 62 for the ball valve 82, for a reason to be explained hereinafter.

Preferably mounted forwardly of the floor board of the driver's seat is the combined power cylinder and reservoir indicated generally by the numeral 84. This construction includes a reservoir 86, passageways 88 and 90 leading to cylinder 92. Mounted in said cylinder is a piston 96 connected to a sealing member or sleeve 94, of rubber-like material. Also connected to the piston and sealing member is a piston rod 98 which is attached to the foot pedal 100 that extends through the floor 102 of the vehicle as shown in Figure 2.

There is a fluid opening 104 at one end of the cylinder to which is connected a flexible conduit 106, whose opposite end is connected to the fluid inlet 56 of cylinder 22. The inlet to the reservoir 86 is indicated at 108. Connected to this inlet is the flexible conduit 110 whose opposite end is connected to the exit 58 leading through cylinder 22. These parts are disconnected in Figure 4 to better illustrate the parts.

*Operation*

As will be noted by reference to the several figures, particularly Figure 4, fluid may be caused to pass to the upper portion of the cylinder 22 through inlet 56 by operation of the foot pedal 100 in the same manner as applying the fluid brake of an automotive fluid brake system. The piston 24 and cylinder 22 connect the chassis and axle of the car respectively to each other in a manner similar to that which the car springs connect the parts to each other. The force which elevates the body of the car with reference to the axle, is the force of the fluid within cylinder 22 applied by means of the pedal 100. As the driver depresses the foot pedal, the pressure within cylinder 92 will be gradually increased particularly as the piston 96 of the power cylinder passes apertures 90 and 88. Such pressure will cause the body including the chassis of the car to be elevated from its normal position as it is suspended on the car springs to a point, where the pressure within the cylinder 22 overcomes the weight of the body of the car. During the time that the body of the car is gradually elevated, the pressure within the cylinder 22 will exert the same amount of force in both an upward and downward direction. In other words, the pressure necessary to raise the body of the car will exert a force on the top of the piston 24, and since this piston is firmly attached to the differential of the car, such force will be transmitted through the piston to the axle of the car and by means of the axle, to the car's drive wheels. This statement is based on the principle of physics, to wit: "to raise 1 lb. by 33,000 feet equals raising 33,000 lbs. by 1 foot." In other words, as the car's body is pushed upwardly by an upwardly moving force, the drive wheels of the car are pushed downwardly by an equal amount of force. This will cause the tires to "grab" the ice, mud, or snow in which they are in contact. When the operator releases the foot pedal, the body of the car will come down to its normal position, at which moment the driver can again depress the foot pedal and exert as much pressure or add as much additional pressure to the tires for as long a period as desired. This second action on the part of the driver will cause the tires to again "grab" or take hold of the surface with which they are in engagement, and the operation may be repeated as many times and at such intervals of time as the operator may find necessary in order to afford increased traction to get the car out of the position where it was stuck. In practice, two out of three operations of the foot pedal by the driver should be able to obtain enough extra traction to get out of the position in which the tires of the drive wheels are stuck and sometimes a single depression of the foot pedal 100 will be sufficient to accomplish the desired result.

Due to the operation of piston 96, which is below the oil reservoir, the pressure line 106 will always have a certain amount of pressure in it, since the weight of the oil in the oil reservoir 86 is connected to the master cylinder by opening 88. This also means that a certain amount of pressure in the pressure line 106 will maintain a certain amount of pressure in the cylinder 22. The fact that the pressure line and the cylinder are always filled with fluid will afford a quick, instantaneous action by the cylinders 22 and piston 24, the instant the driver depresses the foot pedal 100. Due to the position of the lines 106 and 110, the latter of which is above the oil level in the reservoir 86, the relief line will have no pressure in it, and the fluid coming back from the cylinder 22 through the relief line 110 will not cause any disturbance or any particular increase of pressure in the oil reservoir, since there is a certain amount of free space between the oil level in the oil reservoir and the top of the oil reservoir. In other words, the fluid in the system will always flow in a one-way circle, starting from the power master cylinder 92, through the pressure line 106, to cylinder 22 and then out of this cylinder through the relief opening 58 and line 110 into the oil reservoir 86.

The above description and drawings disclose a single embodiment of the invention, and specific language has been employed in describing the several figures. It will, nevertheless, be understood that no limitations of the scope of the invention are thereby contemplated, and that various alterations and modifications may be made such as would occur to one skilled in the art to which the invention relates.

I claim:

1. An anti-skid apparatus for automotive vehicles having a rear drive axle and a differential for said drive axle including a pair of elements comprising a piston and cylinder, means connecting one of said elements to the rear axle of said automotive vehicle, means for connecting the other of said elements to the body of said vehicle, a power cylinder and piston assembly, manual means for operating the piston of said assembly, and fluid conduit means connecting said power cylinder and piston assembly to said cylinder first-named; said conduit means comprising a first conduit to convey fluid from said power cylinder to said first-named cylinder, and a second conduit to convey fluid from said first-named cylinder back to said power cylinder; and spaced alternately seated valves in said first-named cylinder to control fluid flow into and out of said first-named cylinder and through said conduits.

2. An anti-skid apparatus for automotive vehicles having a rear drive axle and a differential for said drive axle including a pair of elements comprising a piston and cylinder, means connecting one of said elements to the rear axle of said automotive vehicle, means for connecting the other of said elements to the body of said vehicle, a power cylinder and piston assembly, manual means for operating the piston of said assembly, and fluid conduit means connecting said power cylinder and piston assembly to said cylinder first-named; said conduit means comprising a first conduit to convey fluid from said power cylinder to said first-named cylinder, and a second conduit to convey fluid from said first-named cylinder back to said power cylinder; and spaced alternately seated valves in said first-named cylinder to control fluid flow into and out of said first-named cylinder and through said conduits, said power cylinder and piston assembly including a fluid reservoir to receive fluid from said second conduit and a passageway connecting said reservoir to the cylinder of said assembly.

3. An anti-skid apparatus for automotive vehicles having a rear drive axle and a differential for said drive axle including a pair of elements comprising a piston and cylinder, means connecting one of said elements to the rear axle of said automotive vehicle and indirectly to its drive wheels, means for connecting the other of said elements to the body of said vehicle, a power cylinder and piston assembly, manual means for operating the piston of said assembly, fluid conduit means connecting said power cylinder and piston assembly to said cylinder first-named; said conduit means comprising a first conduit to convey fluid from said power cylinder to said first-named cylinder, and a second conduit to convey fluid from said first-named cylinder back to said power cylinder; and spaced alternately seated valves carried by said first-named cylinder to control fluid flow into and out of said first-named cylinder and through said conduits, said valves being connected together to move in unison, said means connecting one of said elements to said axle comprising means connecting said piston to a differential housing of said automotive vehicle and indirectly to said drive wheels, and means connecting said other element to said body comprising a universal joint attaching said cylinder to said body.

4. An anti-skid apparatus for automotive vehicles having a rear drive axle and a differential for said drive axle including a pair of elements comprising a piston and cylinder, means connecting one of said elements to the rear axle of said automotive vehicle, means for connecting the other of said elements to the body of said vehicle, a power cylinder and piston assembly, manual means for operating the piston of said assembly, and fluid conduit means connecting said power cylinder and piston assembly to said cylinder first-named, said first-named cylinder having a pair of semi-spherical seats in its wall, a valve removably attached to said cylinder first-named and including a sliding rod having a pair of alternately seated ball valves on the ends thereof, each of said ball valves being mounted in a position to control flow through one of said valve seats.

5. An anti-skid apparatus for automotive vehicles having a rear drive axle and a differential for said drive axle including a pair of elements comprising a piston and cylinder, means connecting one of said elements to the rear axle of said automotive vehicle, means for connecting the other of said elements to the body of said vehicle, a power cylinder and piston assembly, manual means for operating the piston of said assembly, and fluid conduit means connecting said power cylinder and piston assembly to said cylinder first-named, said power cylinder and piston assembly including a fluid reservoir and a fluid passageway connecting said reservoir to the cylinder of said assembly, said first-named cylinder having a pair of semi-spherical seats in its wall, a valve means removably attached to said cylinder first-named and including a sliding rod having ball valves on the ends thereof, a bearing member in said first-named cylinder, said bearing member being detachably secured to one end of said cylinder and said rod being slidable therein, said rod being adapted to slide axially between said seats to alternately seat and unseat said ball valves.

6. An anti-skid apparatus for automotive vehicles having a rear drive axle and a differential for said drive axle including a pair of elements comprising a piston and cylinder, means connecting one of said elements to the rear axle of said automotive vehicle, means for connecting the other of said elements to the body of said vehicle, a power cylinder and piston assembly, manual means for operating the piston of said assembly, fluid conduit means connecting said power cylinder and piston assembly to said cylinder first-named, said means connecting one of said elements to said axle comprising means connecting said piston to a differential housing of said automotive vehicle, and said means connecting said other element to said body comprising a universal joint attaching said cylinder to said body, said first-named cylinder having a pair of semi-spherical seats in its wall, a valve means removably attached to said cylinder first-named including a sliding rod having ball valves on the ends thereof, said ball valves being pressure actuated and rigidly connected to said rod to move in unison, and being alternately seated on said valve seats to control flow into and out of said first-named cylinder.

7. An anti-skid apparatus for automotive vehicles having a rear drive axle and a differential for said drive axle including a pair of elements comprising a piston and cylinder, means connecting one of said elements to the rear axle of said automotive vehicle, means for connecting the other of said elements to the body of said vehicle, a power cylinder and piston assembly, manual means for operating the piston of said assembly, fluid conduit means connecting said power cylinder and piston assembly to said cylinder first-named, said power cylinder and piston assembly including a fluid reservoir and a passageway connecting said reservoir to the cylinder of said assembly, said means connecting one of said elements to said axle comprising means connecting said piston to a differential housing of said automotive vehicle, and said means connecting said other element to said body comprising a universal joint attaching said cylinder to said body, said first-named cylinder having a pair of semi-spherical seats in its side wall, a valve means removably attached to said cylinder first-named and including a sliding rod movable axially between said valve seats and having ball valves on the ends thereof to alternately seat on said valve seats, one of said ball valves being larger than the other.

8. An anti-skid apparatus for automotive vehicles having a rear drive axle and a differential for said drive axle including a pair of elements comprising a piston and cylinder, means connecting one of said elements to the rear axle of said automotive vehicle, means for connecting the other of said elements to the body of said vehicle, a power cylinder and piston assembly, manual means for operating the piston of said assembly, fluid conduit means connecting said power cylinder and piston assembly to said cylinder first-named, said means connecting one of said elements to said axle comprising means connecting said piston to a differential housing of said automotive vehicle, and said means connecting said other element to said body comprising a universal joint attaching said cylinder to said body, said first-named cylinder having a pair of semi-spherical seats in its side wall, a valve means removably attached to said cylinder last-named including a sliding rod having ball valves on the ends thereof, one of said ball valves being larger than the other and the radius of each ball valve being substantially equal to the radius of its seat.

References Cited in the file of this patent
UNITED STATES PATENTS

| | | |
|---|---|---|
| 2,560,625 | Boggs et al. | July 17, 1951 |
| 2,648,546 | Falkenhagen | Aug. 11, 1953 |
| 2,728,583 | Tucker | Dec. 27, 1955 |